United States Patent
Shimura

[19]
[11] Patent Number: 6,104,503
[45] Date of Patent: *Aug. 15, 2000

[54] IMAGE PROCESSING AND REPRODUCING APPARATUS

[75] Inventor: Kazuo Shimura, Kanagawa-ken, Japan

[73] Assignee: Fuji Photo Film Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/917,683

[22] Filed: Aug. 26, 1997

[30] Foreign Application Priority Data

Aug. 26, 1996 [JP] Japan .................................. 8-223871

[51] Int. Cl.[7] .............................. G06T 15/00; G05B 11/00
[52] U.S. Cl. ............................. 358/1.9; 382/270; 382/260
[58] Field of Search ..................................... 395/114, 115, 395/116, 109, 112, 101; 358/296, 261, 451, 147, 284, 447, 1.9; 382/263, 299, 128, 130, 131, 132; 250/256, 363.02, 363.04, 370.09

[56] References Cited

U.S. PATENT DOCUMENTS

| | | | |
|---|---|---|---|
| 4,748,511 | 5/1988 | Nichols et al. ........................... | 358/256 |
| 4,792,900 | 12/1988 | Sones et al. ........................ | 382/413.23 |
| 4,825,365 | 4/1989 | Inoue .................................. | 364/413.19 |
| 5,046,147 | 9/1991 | Funahashi et al. ................... | 250/327.2 |
| 5,454,044 | 9/1995 | Nakajima . | |
| 5,454,053 | 9/1995 | Okubo et al. ............................ | 382/270 |
| 5,493,622 | 2/1996 | Tsuchino et al. ....................... | 382/132 |
| 5,652,830 | 7/1997 | Yamamoto et al. ..................... | 395/115 |
| 5,748,799 | 5/1998 | Shimura .................................. | 382/260 |

FOREIGN PATENT DOCUMENTS

| | | | |
|---|---|---|---|
| 0 736 842 | 10/1996 | European Pat. Off. .......... | G06T 5/40 |
| 5-91276 | 4/1993 | Japan .............................. | H04N 1/32 |

*Primary Examiner*—Jerome Grant, II
*Assistant Examiner*—Douglas Tran
*Attorney, Agent, or Firm*—Sughrue, Mion, Zinn, Macpeak & Seas, PLLC

[57] ABSTRACT

An image processing and reproducing apparatus comprises an image signal output device for outputting an image signal representing an image, a plurality of image displaying devices, each of which reproduces a visible image from the received image signal and displays the visible image, and a transmission line for transmitting the image signal, which has been outputted from the image signal output device, to the plurality of the image displaying devices. The image signal output device is provided with a first image processing section for carrying out principal image processing on an original image signal representing an original image. Each of the image displaying devices is provided with a second image processing section for carrying out necessary image processing, which is other than the principal image processing, on an image signal, which has been obtained from the principal image processing. The image processing and image displaying are thereby carried out quickly, and the cost of the apparatus is kept low.

12 Claims, 3 Drawing Sheets

FIG.2

PRIOR ART

F I G. 3

IMAGE PROCESSING AND REPRODUCING APPARATUS

BACKGROUND OF THE INVENTION

1. Field of the Invention

This invention relates to an image processing and reproducing apparatus. This invention particularly relates to an image processing and reproducing apparatus, in which a plurality of image displaying means are associated with a single image signal output means.

2. Description of the Prior Art

Image processing and reproducing apparatuses have heretofore been used, which comprise an image signal output means for outputting an image signal representing an image, a transmission means for transmitting the image signal having been outputted from the image signal output means, and an image displaying means for reproducing a visible image from the image signal received via the transmission means and displaying the visible image. In the image processing and reproducing apparatuses, predetermined image processing is carried out on the image signal, and the visible image is reproduced from the processed image and displayed on the image displaying means.

For example, image processing and reproducing apparatuses have heretofore been used, in which a radiation image having been recorded on photographic film is photoelectrically read out, an image signal representing the radiation image being thereby obtained, appropriate image processing is carried out on the image signal, and then a visible image is reproduced from the processed image signal. Also, radiation image processing and reproducing apparatuses, in which stimulable phosphors are utilized, have heretofore been used. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then subjected to appropriate image processing and used for the reproduction of the radiation image of the object as a visible image on a recording material, such as photographic material, or on a display device, such as a cathode ray tube (CRT) display device.

Examples of the image processing principally include frequency emphasis processing (hereinbelow referred to as the USM processing), dynamic range compression processing (hereinbelow referred to as the DRC processing), and gradation processing.

With the USM processing, an unsharp mask image signal Sus corresponding to super-low frequency is calculated with respect to each of picture elements in an original image, and a processed image signal Sproc is calculated with formula shown below.

Sproc=Sorg+β·(Sorg-Sus)

wherein Sorg represents the original image signal, and β represents the emphasis coefficient. In this manner, frequency components higher than the super-low frequency are emphasized. The USM processing is disclosed in, for example, Japanese Unexamined Patent Publication No. 62(1987)-62373.

With the DRC processing, in order that portions of an image covering as wide a range of image density as possible can be used, the level of contrast of the portions of the image having a high or low image density or the level of contrast of the entire area of the image is rendered low such that the difference between the highest image density and the lowest image density may become small, i.e. such that the dynamic range of the image may become narrow. In such cases, if the level of contrast is merely rendered low, the problems will occur in that details of the image information in the image region, at which the level of contrast has been lowered, becomes hard to observe. Accordingly, various DRC processing methods for eliminating such problems have been proposed by the applicant in, for example, U.S. Pat. No. 5,454,044 and Japanese Unexamined Patent Publication No. 5(1993)-91276.

In the DRC processing methods proposed by the applicant, image processing is carried out with the formula shown below.

Sproc=Sorg+D(Sus)

wherein D(Sus) represents an arbitrary function with respect to the value of the unsharp mask image signal Sus, and Sproc represents the processed image signal. As the function D(Sus), a function, the value of which decreases monotonously as the value of the unsharp mask image signal Sus increases, or a function, the value of which decreases monotonously as the value of the unsharp mask image signal Sus increases and in which the differential coefficient is continuous, is employed. The way, in which the value of the function decreases monotonously, may be set appropriately in accordance with the desired results, which are to be obtained from the image processing.

Also, the calculation of the unsharp mask image signal Sus may be carried out in various ways. In the simplest method of calculating the unsharp mask image signal Sus, the value of the unsharp mask image signal Sus corresponding to each of picture elements in the original image is calculated by averaging the values of image signal components of the original image signal Sorg representing the original image, which image signal components represent the picture elements belonging to a predetermined region surrounding each of the picture elements. An example of the method of calculating the unsharp mask image signal Sus will be described hereinbelow.

Figure 3:
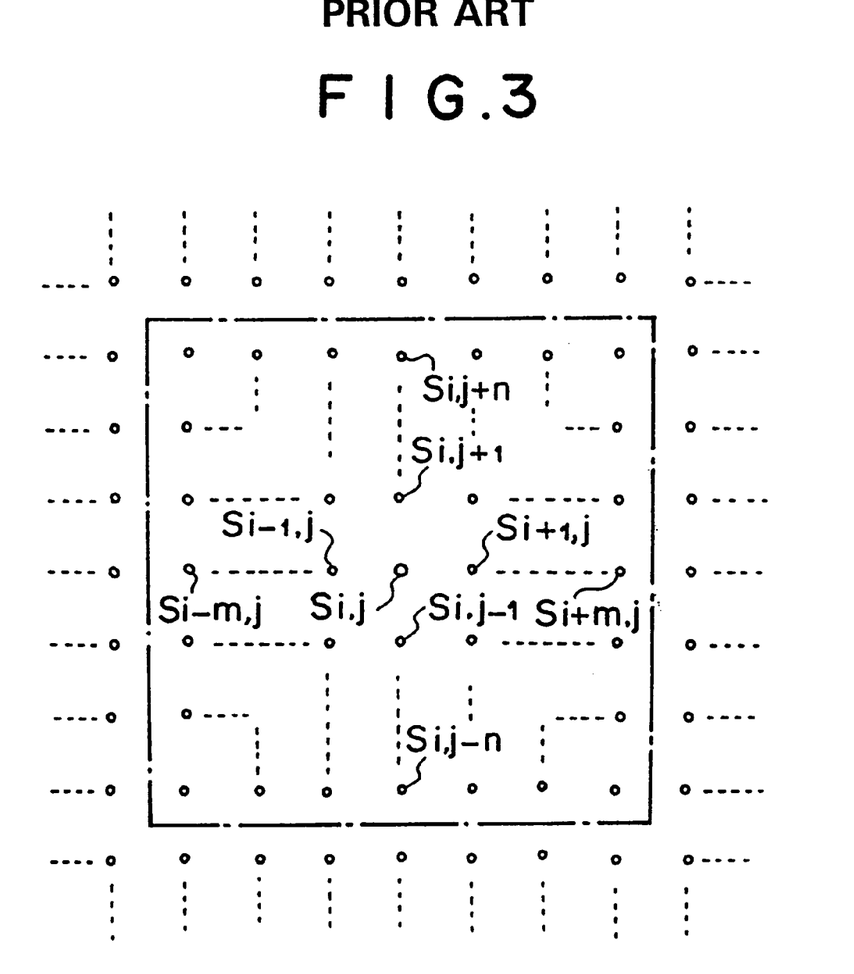
FIG. 3 is an explanatory view showing picture elements in an original image and image signal components of an original image signal Sorg, which represent the picture elements.

FIG. 3 is an explanatory view showing picture elements in an original image (i.e., an image before being processed) and image signal components of an original image signal (i.e., an image signal representing the original image) Sorg, which represent the picture elements. In FIG. 3, dots represent the picture elements, and the symbols, such as $S_{ij}$, represent the image signal components of the original image signal Sorg which represent the corresponding picture elements. The value of an unsharp mask image signal $Sus_{ij}$ for the picture element $S_{ij}$, which is located in the middle of the region surrounded by the chained line, is calculated with the formula shown below.

$$Sus_{ij} = \frac{\sum_{K=-m}^{m} \sum_{l=-n}^{n} S_{i+k,j+1}}{(2m+1) \cdot (2n+1)}$$

The calculation is carried out for every picture element, and an unsharp mask image signal Sus for the whole image is thereby generated. The values of m and n are determined arbitrarily in accordance with the sampling intervals, with which the original image signal Sorg was obtained, the characteristics of the original image, the kind of the desired image processing, or the like.

The USM processing method and the DRC processing method described above are the most basic USM processing method and the most basic DRC processing method. Besides the USM processing method and the DRC processing method described above, techniques for transforming an original image into multi-resolution images by use of an unsharp mask filter and carrying out image processing by use of a plurality of unsharp mask image signals, which represent unsharp images of respective levels of resolution, have also been proposed. For example, as proposed in U.S. Ser. No. 08/723,313, a filtering process with a filter having a predetermined size is repeated, and multi-resolution images are thereby obtained. Specifically, a plurality of unsharp mask image signals $Sus_k$, where k=1 to N, are thereby obtained.

As proposed in U.S. Ser. No. 08/723,313, by use of a plurality of unsharp mask image signals described above, frequency emphasis processing can be carried out such that the occurrence of an artifact in a region in the vicinity of an edge in the image may be restricted. In such cases, a processed image signal Sproc can be obtained by carrying an operation represented by, for example, the formula shown below.

$$Sproc=Sorg+\beta(Sorg)\cdot Fusm(Sorg,Sus_1,Sus_2,\ldots,Sus_N)$$

$$Fusm(Sorg, Sus_1, Sus_2, \ldots, Sus_N)$$

$$=\{f_1(Sorg-Sus_1)+f_2(Sus_1-Sus_2)+\ldots+f_k(Sus_{k-1}-Sus_k)+\ldots+f_{N^-}(Sus_{N-1}-Sus_N)\}$$

wherein $Sus_k$(k=1 to N) represents the unsharp mask image signal, and $f_k$(k=1 to N) represents the function for converting the band-limited image signal.

Also, as proposed in U.S. Ser. No. 08/723,313, by use of a plurality of unsharp mask image signals described above, dynamic range compression processing can be carried out such that the occurrence of an artifact may be restricted as in the afore said frequency emphasis processing. In such cases, a processed image signal Sproc can be obtained by carrying an operation represented by, for example, the formula shown below.

$$Sproc=Sorg+D(Sorg-Fdrc(Sorg, Sus_1, Sus_2, \ldots, SUS_N))$$

$$Fdrc(Sorg,Sus_1,Sus_2, \ldots, Sus_N)$$

$$=\{f_1(Sorg-Sus_1)+f_2(Sus_1-Sus_2)+\ldots+f_k(Sus_{k-1}-Sus_k)+\ldots+f_{N^-}(Sus_{N-1}-Sus_N)\}$$

wherein $Sus_k$(k=1 to N) represents the unsharp mask image signal, and $f_k$(k=1 to N) represents the function for converting the band-limited image signal.

If specific hardware functions having a high calculation capability are not used, the calculation of the unsharp mask image signals Sus ($Sus_k$) or the calculation of the processed image signal Sproc, such as the frequency emphasis-processed signal or the dynamic range compression-processed signal, depending upon the unsharp mask image signals Sus, cannot be carried out quickly.

Conventional image processing and reproducing apparatuses are ordinarily constituted such that an image displaying means may be provided with an image processing section and may carry out image processing on an image signal, which has been received from an image signal output means, and the processed image signal may be fed into a CRT display device, or the like. For example, in cases where a plurality of image displaying means are associated with a single image signal output means via a transmission means, each of the image displaying means has heretofore been provided with the image processing section for carrying out the image processing.

However, in the image processing and reproducing apparatus, in which each of the image displaying means is provided with the image processing section for carrying out the complicated image processing, such as the USM processing or the DRC processing, in cases where the image processing is to be carried out quickly, the problems occur in that the cost of the whole apparatus cannot be kept low. Also, in cases where the cost of the apparatus is to be kept low, the problems occur in that a long time is required to carry out the image processing, and the image displaying cannot be carried out quickly. Specifically, in the cases of the USM processing or the DRC processing described above, the amount of calculations to be carried out is very large. Therefore, in order for the USM processing or the DRC processing to be carried out quickly, it is necessary for specific hardware functions, which have a high calculation capability and are expensive, to be used as the image processing section. In cases where the specific hardware functions are employed in each of the plurality of the image displaying means, the problems occur in that the cost of the whole apparatus cannot be kept low. Also, in cases where ordinary hardware functions are employed such that the cost of the apparatus maybe kept low, the problems occur in that a long time is required to carry out the calculations, and the image displaying cannot be carried out quickly.

SUMMARY OF THE INVENTION

The primary object of the present invention is to provide an image processing and reproducing apparatus, in which a plurality of image displaying means are associated with a single image signal output means, such that image processing and image displaying may be carried out quickly and the cost of the apparatus may be kept low.

The present invention provides an image processing and reproducing apparatus, comprising:

i) an image signal output means for outputting an image signal representing an image, ii) a plurality of image displaying means, each of which reproduces a visible image from the received image signal and displays the visible image, and iii) a transmission means for transmitting the image signal, which has been outputted from the image signal output means, to the plurality of the image displaying means, image processing being carried out on the image signal, an image signal obtained from the image processing being used for displaying the visible image on the image displaying means, wherein the image signal output means is provided with a first image processing section for carrying out principal image processing on an original image signal representing an original image, and each of the plurality of the image displaying means is provided with a second image processing section for carrying out necessary image processing, which is other than the principal image processing, on an image signal, which has been obtained from the principal image processing.

The term "principal image processing" as used herein means, for example, complicated processing, such as frequency processing. Specifically, the principal image processing may be frequency emphasis processing and/or dynamic range compression processing, or the like. The term "other necessary image processing" as used herein means, for example, simple processing, such as gradation processing. The other necessary image processing may be carried out only when necessary.

Also, the image signal output means may output the image signal, which has been obtained from the principal image processing, and the original image signal, and each of the plurality of the image displaying means may carry out the image processing by using the original image signal.

In such cases, the principal image processing, which is carried out by the first image processing section, may be a portion of frequency emphasis processing and/or dynamic range compression processing, and the other necessary image processing, which is carried out by the second image processing section, may be the remainder of the frequency emphasis processing and/or the dynamic range compression processing.

The term "portion of frequency emphasis processing and/or dynamic range compression processing" as used herein means the processing for forming intermediate processed image signal in the frequency emphasis processing and/or the dynamic range compression processing. For example, the portion of frequency emphasis processing and/or dynamic range compression processing may be the processing for forming at least one intermediate processed image signal, which is selected from the group consisting of an unsharp mask image signal Sus, a signal representing Sorg-Sus used in the frequency emphasis processing, where Sorg represents the original image signal, a signal representing $\beta \cdot (Sorg-Sus)$ used in the frequency emphasis processing, where $\beta$ represents the emphasis coefficient, and a signal representing a function $D(Sus)$ in accordance with the unsharp mask image signal Sus, the function being used in the dynamic range compression processing.

At least one image displaying means, which is among the plurality of the image displaying means, may be provided with an instruction means for instructing the image signal output means to alter image processing conditions, under which the principal image processing is carried out, and the image signal output means may carry out the principal image processing under the instructed image processing conditions.

Further, at least one image displaying means, which is among the plurality of the image displaying means, may further be provided with an image processing section for carrying out the principal image processing on the original image signal. In such cases, the image processing section may also serve as the second image processing section.

The image processing and reproducing apparatus may further comprise a filing means for storing the image signal received from the image signal output means, and the image signal may be transmitted from the filing means to each of the plurality of the image displaying means.

As described above, in the image processing and reproducing apparatus in accordance with the present invention, the whole or a portion of complicated image processing is collectively carried out on the side of the image signal output means, and the image signal obtained from the image processing is fed into the plurality of the image displaying means.

With the image processing and reproducing apparatus in accordance with the present invention, the image signal output means is provided with the first image processing section for carrying out the principal image processing, and the principal image processing is carried out on the side of the image signal output means. The image signal, which has been obtained from the principal image processing, is transmitted to each image displaying means. Each image displaying means carries out only the necessary image processing, which is other than the principal image processing, and displays the visible image reproduced from the processed image signal. Therefore, as the image processing section for carrying out the principal image processing, it is sufficient for the image processing and reproducing apparatus in accordance with the present invention to be provided with only one image processing section. Accordingly, the cost of the image processing and reproducing apparatus can be kept lower than in the conventional image processing and reproducing apparatus, wherein each image displaying means is provided with the image processing section for carrying out all of the image processing.

In particular, in cases where the principal image processing is the image processing, such as the USM processing or the DRC processing, in which the amount of calculations to be carried out is very large, in order for the image processing to be carried out quickly, it is necessary for specific hardware functions, which have a high calculation capability and are expensive, to be used as the image processing section. However, with the image processing and reproducing apparatus in accordance with the present invention, it is sufficient for only one first image processing section to be located in the image signal output means. Therefore, even if expensive hardware functions are used as the first image processing section, an increase in cost of the entire apparatus can be restricted. Accordingly, even in cases where the image processing, such as the USM processing or the DRC processing, in which the amount of calculations to be carried out is very large, is to be carried out, the image processing can be carried out quickly, and the cost of the entire apparatus can be kept low.

Also, with the image processing and reproducing apparatus in accordance with the present invention, at least one image displaying means, which is among the plurality of the image displaying means, may be provided with the instruction means for instructing the image signal output means to alter the image processing conditions. In such cases, for example, even if the principal image processing, which was firstly carried out by the image signal output means, was not the desired processing, image processing can again be carried out under the desired image processing conditions in the image signal output means, and a desired processed image can be obtained quickly.

Further, with the image processing and reproducing apparatus in accordance with the present invention, at least one image displaying means, which is among the plurality of the image displaying means, may further be provided with the image processing section for carrying out the principal image processing on the original image signal. In such cases, for example, even if the principal image processing, which was firstly carried out by the image signal output means, was not the desired processing, image processing can be carried out under the desired image processing conditions in the image displaying means, and a desired processed image can be obtained. Ordinarily, it rarely occurs that the image processing conditions are to be altered. Therefore, the image signal output means need not necessarily be provided with quick-operating, expensive hardware functions, and an increase in cost of the apparatus can be restricted.

DESCRIPTION OF THE PREFERRED EMBODIMENTS

The present invention will hereinbelow be described in further detail with reference to the accompanying drawings.

Figure 1:
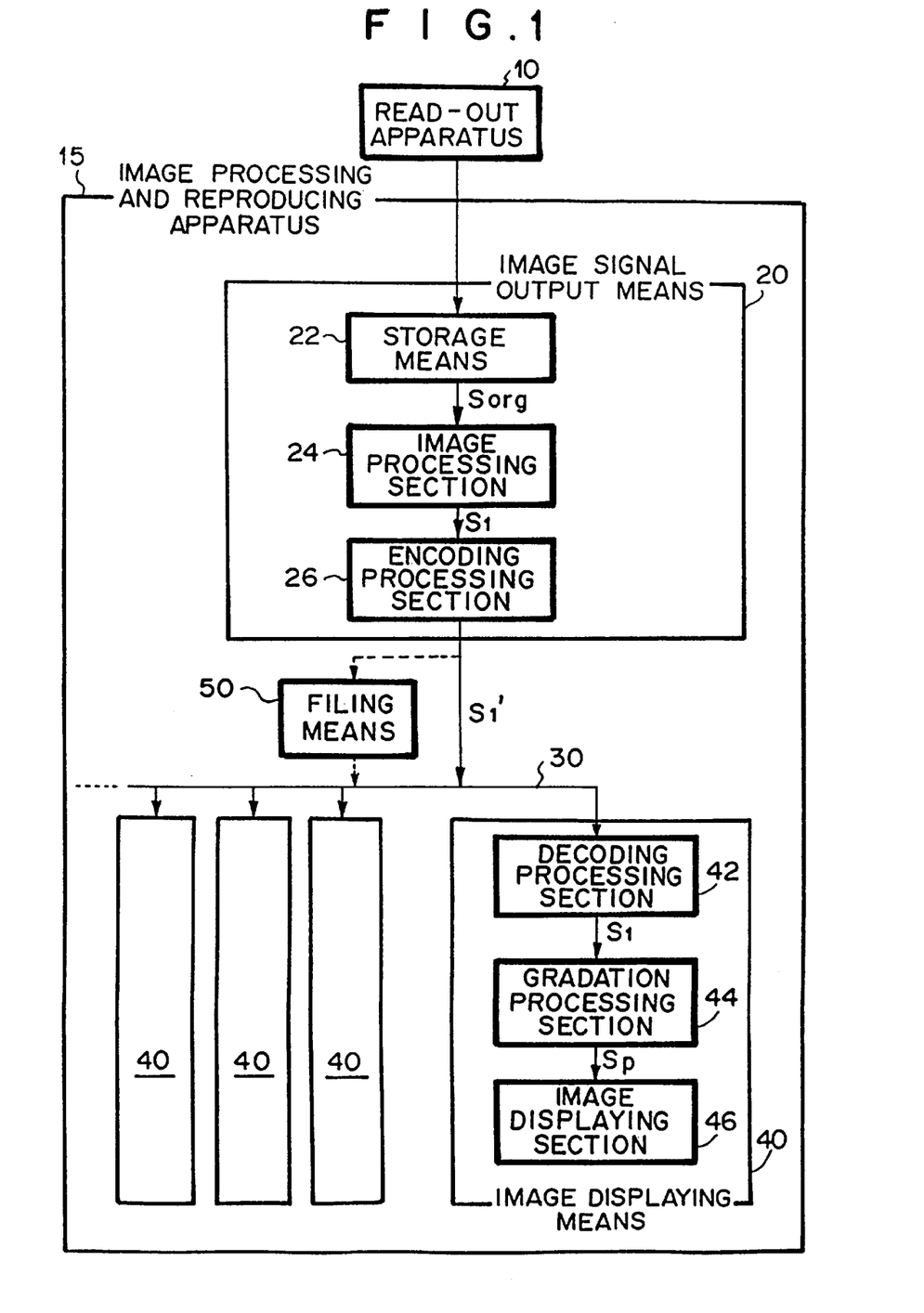
FIG. 1 is a schematic block diagram showing a first embodiment of the image processing and reproducing apparatus in accordance with the present invention.

Firstly, a first embodiment of the image processing and reproducing apparatus in accordance with the present invention will be described hereinbelow with reference to FIG. 1.

An image processing and reproducing apparatus 15 comprises an image signal output means 20 for carrying out predetermined image processing on an original image signal Sorg and feeding out a processed image signal $S_1$, and a transmission means 30 for transmitting the processed image signal $S_1$. The image processing and reproducing apparatus also comprises a plurality of image displaying means 40, 40, . . . , each of which reproduces a visible image from the processed image signal $S_1$ received via the transmission means 30 and displays the visible image. The term "predetermined image processing" as used in this embodiment corresponds to the "principal image processing" described above.

By way of example, an X-ray image read-out apparatus 10 detects an analog signal from a stimulable phosphor sheet, on which an X-ray image has been recorded with an X-ray image recording apparatus (not shown). The analog signal is then digitized by an analog-to-digital converter (not shown), and the original image signal Sorg is thereby obtained. The original image signal Sorg is fed into the image signal output means 20. The original image signal Sorg may be acquired with any of other techniques. For example, the original image signal Sorg may be obtained from a CT scanner with a video acquiring device or may be obtained from an MR imaging equipment with a digital signal acquiring means.

The image signal output means 20 comprises a storage means 22 for storing the original image signal Sorg, and an image processing section 24 for carrying out the predetermined image processing on the original image signal Sorg. The image signal output means 20 also comprises an encoding processing section 26 for carrying out redundancy suppression encoding processing on the processed image signal $S_1$, which has been obtained from the image processing. An encoded processed image signal $S_1'$ is obtained from the encoding processing.

Each of the plurality of the image displaying means 40, 40, . . . comprises a decoding processing section 42 for carrying out decoding processing on the encoded processed image signal $S_1'$, and a gradation processing section 44 for carrying out gradation processing on the processed image signal $S_1$, which has been obtained from the decoding processing. A gradation-processed image signal $S_p$ is obtained from the gradation processing. Each image displaying means 40 also comprises an image displaying section 46 for reproducing a processed image from the gradation-processed image signal $S_p$ and displaying the processed image.

In this embodiment, the image processing section 24 corresponds to the "first image processing section" described above. Also, the gradation processing section 44 corresponds to the "second image processing section" described above.

How the image processing and reproducing apparatus 15 operates will be described hereinbelow.

In the image signal output means 20, the original image signal Sorg is fed from the storage means 22 into the image processing section 24. In the image processing section 24, the predetermined image processing is carried out on the original image signal Sorg. By way of example, the predetermined image processing may be the frequency emphasis processing (i.e., the USM processing) described above, the dynamic range compression processing (i.e., the DRC processing) described above, or the like.

In cases where the predetermined image processing is the USM processing, an unsharp mask image signal Sus with respect to each of picture elements in the original image is calculated from the original image signal Sorg with the method described above. Also, the frequency emphasis processing is carried out by using the unsharp mask image signal Sus, and a signal representing Sorg+β (Sorg-Sus) is thereby obtained as the processed image signal $S_1$.

In cases where the predetermined image processing is the DRC processing, the dynamic range compression processing is carried out by using the unsharp mask image signal Sus, and a signal representing Sorg+D(Sus) is thereby obtained as the processed image signal $S_1$.

The processed image signal $S_1$ having been obtained from the image processing section 24 is fed into the encoding processing section 26. In the encoding processing section 26, the redundancy suppression encoding processing is carried out on the processed image signal $S_1$, and the encoded processed image signal $S_1'$ is thereby obtained. The encoded processed image signal $S_1'$ is transmitted via the transmission means 30 into each of the image displaying means 40, 40, . . . In each image displaying means 40, the encoded processed image signal $S_1'$ is decoded into the processed image signal $S_1$ by the decoding processing section 42. The processed image signal $S_1$ is then fed from the decoding processing section 42 into the gradation processing section 44. In the gradation processing section 44, when necessary, the gradation processing is carried out on the processed image signal $S_1$. The gradation-processed image signal $S_p$ having thus been obtained from the gradation processing section 44 is fed into the image displaying section 46. In the image displaying section 46, a visible image is reproduced from the gradation-processed image signal $S_p$ and displayed.

As a modification of this embodiment, a filing means 50 for storing the encoded processed image signal $S_1'$ which has been encoded in the image signal output means 20, may be utilized, and the encoded processed image signal $S_1'$, may be transmitted from the filing means 50 to each image displaying means 40 via the transmission means 30. In such cases, as illustrated in FIG. 1, the filing means 50 may be located as means independent of the image signal output means 20. Alternatively, the filing means 50 maybe located in the image signal output means 20. Specifically, for example, the storage means 22 of the image signal output means 20 may also serve as the filing means 50. In such cases, a plurality of encoded processed image signals $S_1'$, $S_1'$, . . . corresponding to different images can be stored in the filing means 50. When necessary, an encoded processed image signal $S_1'$ can be specified from each image displaying means 40 and can thus be read out from the filing means 50 into each image displaying means 40 via the transmission means 30.

A second embodiment of the image processing and reproducing apparatus in accordance with the present invention will be described hereinbelow with reference to FIG. 2.

Figure 2:
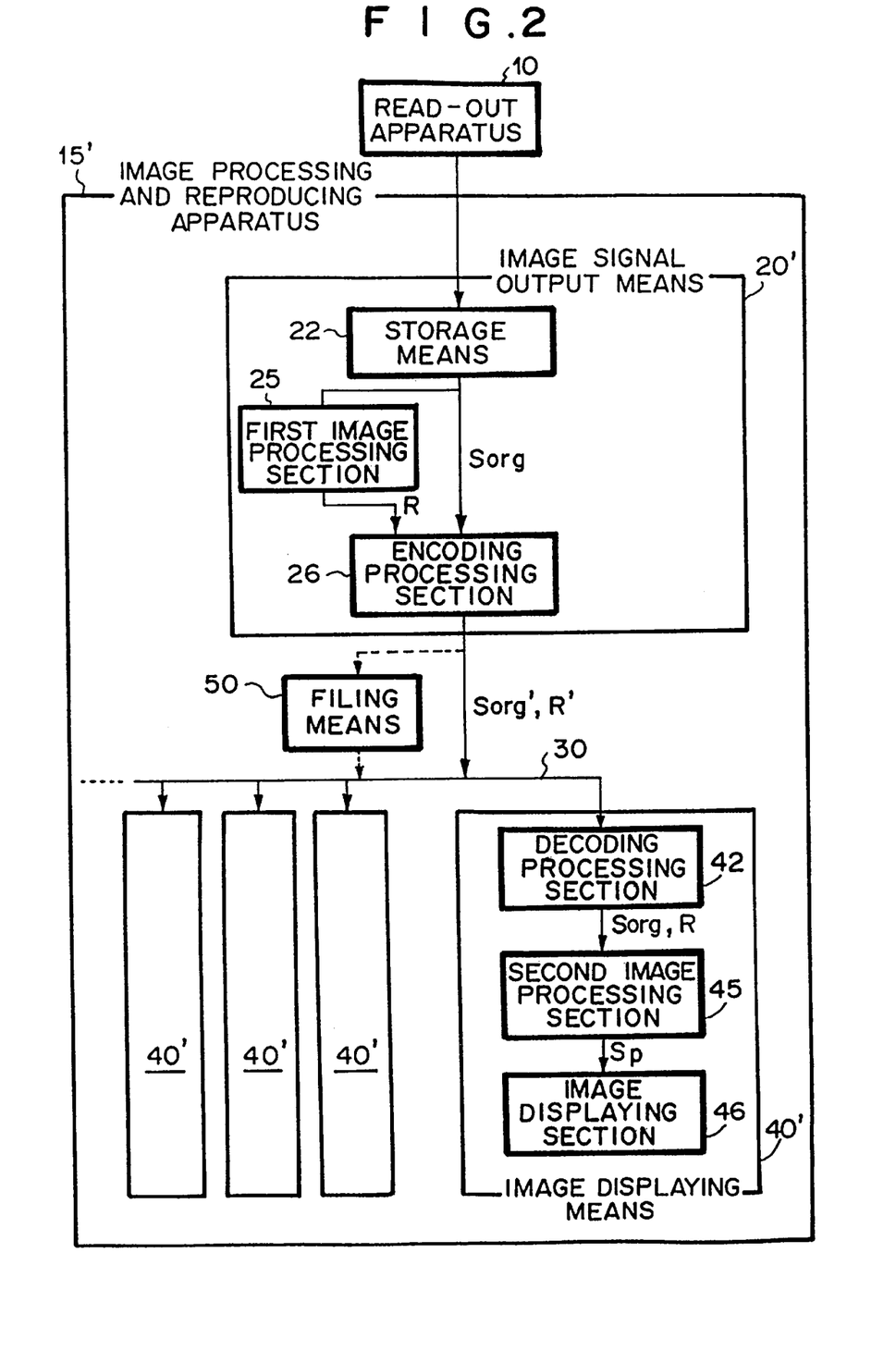
FIG. 2 is a schematic block diagram showing a second embodiment of the image processing and reproducing apparatus in accordance with the present invention.

As illustrated in FIG. 2, an image processing and reproducing apparatus 15' comprises an image signal output means 20' for carrying out a portion of predetermined image processing on an original image signal Sorg and thereby forming an intermediate processed signal R. The image signal output means 20' feeds out the original image signal Sorg and the intermediate processed signal R. The image processing and reproducing apparatus 15' also comprises the transmission means 30 for transmitting the original image signal Sorg and the intermediate processed signal R. The image processing and reproducing apparatus 15' further comprises a plurality of image displaying means 40', 40', . . . , each of which carries out the remainder of the predetermined image processing by use of the original image signal Sorg and the intermediate processed signal R received via the transmission means 30, reproduces a visible image from the thus obtained image signal, and displays the visible image. The term "portion of predetermined image processing" as used in the second embodiment corresponds to the "principal image processing" described above. Also, the term "intermediate processed signal" as used in the second embodiment corresponds to the "image signal having been obtained from principal image processing" described above.

By way of example, the X-ray image read-out apparatus 10 detects an analog signal from a stimulable phosphor sheet, on which an X-ray image has been recorded with an X-ray image recording apparatus (not shown). The analog signal is then digitized by an analog-to-digital converter (not shown), and the original image signal Sorg is thereby obtained. The original image signal Sorg is fed into the image signal output means 20'. However, as in the first embodiment described above, the original image signal Sorg may be acquired with any of other techniques.

The image signal output means 20' comprises the storage means 22 for storing the original image signal Sorg, and a first image processing section 25 for carrying out a portion of the predetermined image processing on the original image signal Sorg and thereby forming the intermediate processed signal R. The image signal output means 20' also comprises the encoding processing section 26 for carrying out redundancy suppression encoding processing on the original image signal Sorg and the intermediate processed signal R. An encoded original image signal Sorg' and an encoded intermediate processed signal R' are obtained from the encoding processing.

Each of the plurality of the image displaying means 40', 40', . . . comprises the decoding processing section 42 for carrying out decoding processing on the encoded original image signal Sorg' and the encoded intermediate processed signal R'. Each image displaying means 40' also comprises a second image processing section 45 for carrying out the remainder of the predetermined image processing by using the original image signal Sorg and the intermediate processed signal R, which have been obtained from the decoding processing. The second image processing section 45 also has the gradation processing function for carrying out the gradation processing when necessary. The gradation-processed image signal $S_p$ is obtained from the second image processing section 45. Each image displaying means 40' further comprises the image displaying section 46 for reproducing a processed image from the gradation-processed image signal $S_p$ and displaying the processed image.

How the image processing and reproducing apparatus 15' operates will be described hereinbelow.

In the image signal output means 20', the original image signal Sorg is fed from the storage means 22 into the first image processing section 25. In the first image processing section 25, a portion of the predetermined image processing is carried out on the original image signal Sorg, and the intermediate processed signal R is thereby formed. By way of example, the predetermined image processing may be the USM processing described above, the DRC processing described above, or the like.

In cases where the predetermined image processing is the USM processing, the portion of the predetermined image processing, which portion is carried out in the first image processing section 25, is a portion of a process for calculating a processed image signal Sproc=Sorg+β (Sorg-Sus). For example, the portion of the predetermined image processing is a process for calculating, as the intermediate processed signal R, the unsharp mask image signal Sus with respect to each of picture elements in the original image from the original image signal Sorg with the method described above, or a process for calculating the signal representing Sorg-Sus as the intermediate processed signal R. In cases where the predetermined image processing is the DRC processing, the portion of the predetermined image processing, which portion is carried out in the first image processing section 25, is a portion of a process for calculating a processed image signal Sproc=Sorg+D(Sus). For example, the portion of the predetermined image processing is a process for calculating, as the intermediate processed signal R, the unsharp mask image signal Sus as in the cases of the USM processing, or a process for calculating the signal representing D(Sus) as the intermediate processed signal R.

In the encoding processing section 26, the redundancy suppression encoding processing is carried out on the original image signal Sorg and the intermediate processed signal R, and the encoded original image signal Sorg' and the encoded intermediate processed signal R' are thereby obtained. The encoded original image signal Sorg' and the encoded intermediate processed signal R' are transmitted via the transmission means 30 into each of the image displaying means 40', 40', . . . In each image displaying means 40', the encoded original image signal Sorg' and the encoded intermediate processed signal R' are decoded respectively into the original image signal Sorg and the intermediate processed signal R by the decoding processing section 42. The original image signal Sorg and the intermediate processed signal R are then fed from the decoding processing section 42 into the second image processing section 45. In the second image processing section 45, the remainder of the predetermined image processing is carried out by using the original image signal Sorg and the intermediate processed signal R. Specifically, in the second image processing section 45, the predetermined image processing, such as the USM processing or the DRC processing, is completed, and a processed image signal S, is thereby formed. Further, when necessary, the gradation processing is carried out on the processed image signal $S_1$. The gradation-processed image signal $S_p$ having thus been obtained from the second image processing section 45 is fed into the image displaying section 46. In the image displaying section 46, a visible image is reproduced from the gradation-processed image signal $S_p$ and displayed.

As a modification of the second embodiment, the filing means 50 for storing the encoded original image signal Sorg' and the encoded intermediate processed signal R', which have been encoded in the image signal output means 20', may be utilized, and the encoded original image signal Sorg' and the encoded intermediate processed signal R' may be transmitted from the filing means 50 to each image displaying means 40' via the transmission means 30. In such cases, as illustrated in FIG. 2, the filing means 50 may be located as means independent of the image signal output means 20'. Alternatively, the filing means 50 may be located in the image signal output means 20'. Specifically, for example, the storage means 22 of the image signal output means 20' may also serve as the filing means 50. In such cases, a plurality of encoded original image signal Sorg', Sorg', . . . and a plurality of encoded intermediate processed signal R', R', . . . corresponding to different images can be stored in the filing means 50. When necessary, an encoded original image signal Sorg' and an encoded intermediate processed signal R' can be specified from each image displaying means 40' and can thus be read out from the filing means 50 into each image displaying means 40' via the transmission means 30.

In this embodiment, wherein only the portion of the predetermined image processing is carried out in the image signal output means 20', the kind of the image processing and the image processing conditions can be specified from each image displaying means 40', i.e. from the terminal side. For example, in cases where the intermediate processed signal R is the unsharp mask image signal Sus, the selection of the predetermined image processing, such as the USM processing or the DRC processing, can be carried out on the side of each image displaying means 40'. Also, the operation for specifying or altering the emphasis coefficient β in the USM processing, the function D(Sus) with respect to the unsharp mask image signal Sus in the DRC processing, or the like, can be carried out on the side of each image displaying means 40'.

In the first and second embodiments described above, the image processing section 24 of the image signal output means 20 and the first image processing section 25 of the image signal output means 20' are capable of quickly carrying out complicated operations and large amounts of calculations. They may be constituted of hardware functions or the software functions. On the other hand, each of the gradation processing section 44 of each image displaying means 40 and the second image processing section 45 of each image displaying means 40' is constituted of a processing section, which is of lower cost and operates at a lower processing speed than in the image processing section 24 and the first image processing section 25. Therefore, in each embodiment, the complicated operations can be carried out quickly, and it is sufficient for the image processing and reproducing apparatus to be provided with only one processing section for the quick processing, which is expensive. Accordingly, the cost of the entire apparatus can be kept low.

Each of the aforesaid embodiments may be modified such that at least one image displaying means 40 or 40' may be provided with an instruction means for instructing the image signal output means 20 or 20' to alter the image processing conditions used in the image signal output means 20 or 20'. In such modification, for example, in cases where the image processing, which was firstly carried out by the image signal output means 20 or 20', was not the desired processing, alteration of the image processing conditions to desired conditions can be instructed from the image displaying means 40 or 40', which is provided with the instruction means, and a desired image can be obtained quickly.

Further, at least one image displaying means 40 or 40' may further be provided with an image processing section capable of carrying out the image processing, which is ordinarily carried out by the image signal output means 20 or 20'. In such a modification, for example, in cases where the image processing, which was firstly carried out by the image signal output means 20 or 20', was not the desired processing, image processing can be carried out under the desired image processing conditions in the image displaying means 40 or 40'.

The encoding processing section 26, the decoding processing section 42, and the gradation processing section 44 or the gradation processing functions described above may be provided only when necessary. Also, each image displaying means 40 or 40' may be provided with functions for carrying out other simple image processing.

The operation methods, or the like, in the USM processing and the DRC processing are not limited to those described above, and various other methods may be employed. For example, it is possible to employ the USM processing and the DRC processing, in which a plurality of unsharp mask image signals are calculated and processed as proposed in, for example, U.S. Ser. No. 08/723,313. Further, the image processing and reproducing apparatus in accordance with the present invention is not limited to the processing described above. For example, the image processing and reproducing apparatus in accordance with the present invention is also applicable to image processing, in which complicated operation processing is carried out, such as morphology processing for selecting extracting only a specific image portion, such as an abnormal pattern, from a medical image. The morphology processing is proposed in, for example, EP 736842 A1.

What is claimed is:

1. An image processing and reproducing apparatus, comprising:

i) a single image signal output means for outputting an image signal representing an image;

ii) a plurality of image displaying means, each of which reproduces a visible image from the received image signal and displays the visible image; and iii) a transmission means for transmitting the image signal, which has been outputted from the image signal output means, to the plurality of the image displaying means, wherein the image signal output means is provided with a first image processing section for carrying out principal image processing on an original image signal Sorg representing an original image, and each of the plurality of the image displaying means is provided with a second image processing section for carrying out necessary image processing, which is other than said principal image processing, on a first image signal $S_1$, which has been obtained from said principal image processing to obtain a second image signal Sp.

2. An apparatus as defined in claim 1 wherein said principal image processing, which is carried out by said first image processing section, is frequency emphasis processing and/or dynamic range compression processing.

3. An apparatus as defined in claim 1 wherein said other necessary image processing, which is carried out by said second image processing section is gradation processing.

4. An image processing and reproducing apparatus comprising:

i) a single image signal output means for outputting an image signal representing an image;

ii) a plurality of image displaying means, each of which reproduces a visible image from the received image signal and displays the visible image; and iii) a transmission means for transmitting the image signal, which has been outputted from the image signal output means, to the plurality of the image displaying means, wherein the image signal output means is provided with a first image processing section for carrying out principal image processing on an original image signal Sorg representing an original image, and each of the plurality of the image displaying means is provided with a second image processing section for carrying out necessary image processing, which is other than said principal image processing, on a first image signal Sorg+R, which has been obtained from said principal image processing to obtain a second image signal Sp, wherein the image signal output means outputs the first image signal Sorg+R, which has been obtained from said principal image processing and said original image signal, and each of the plurality of the image displaying means carries out the image processing by using said original image signal.

5. An apparatus as defined in claim 4 wherein said principle image processing, which is carried out by said first image processing section, is a portion of frequency emphasis processing and/or dynamic range compression processing, and said other necessary image processing, which is carried out by said second image processing section, is the remainder of said frequency emphasis processing and/or said dynamic range compression processing.

6. An apparatus as defined in claim 5 wherein said portion of frequency emphasis processing and/or dynamic range compression processing is the processing for forming at least one intermediate processed image signal, which is selected from the group consisting of an unsharp mask image signal Sus, a signal representing Sorg-Sus used in the frequency emphasis processing, where Sorg represents said original image signal, a signal representing $\beta \cdot$ (Sorg-Sus) used in the frequency emphasis processing, where $\beta$ represents the emphasis coefficient, and a signal representing a function D(Sus) in accordance with the unsharp mask image signal Sus, the function being used in the dynamic range compression processing.

7. An apparatus as defined in claim 1 wherein at least one image displaying means, which is among the plurality of the image displaying means, is provided with an instruction means for instructing the image signal output means to alter image processing conditions, under which said principal image processing is carried out, and the image signal output means carries out said principal image processing under the instructed image processing conditions.

8. An apparatus as defined in claim 4 wherein at least one image displaying means, which is among the plurality of the image displaying means, is further provided with an image processing section for carrying out said principal image processing on said original image signal.

9. An apparatus as defined in claim 1 wherein the apparatus further comprises a filing means for storing the image signal received from the image signal output means, and the image signal is transmitted from said filing means to each of the plurality of the image displaying means.

10. An apparatus as defined in claim 4, wherein at least one image displaying means, which is among the plurality of the image displaying means, is provided with an instruction means for instructing the image signal output means to alter image processing conditions, under which said principal image processing is carried out, and the image signal output means carries out said principal image processing under the instructed image processing condition.

11. An apparatus as defined in claim 1 wherein the apparatus further comprises a filing means for storing the image signal received from the image signal output means, and the image signal is transmitted from said filing means to each of the plurality of the image displaying means.

12. An apparatus as defined in claim 10, wherein the image processing is carried out by morphology processing for extracting only a specific image portion from a medical image.

* * * * *